J. A. HEANY.
ELECTRIC WELDING SYSTEM.
APPLICATION FILED OCT. 7, 1912.
1,061,377.
Patented May 13, 1913.
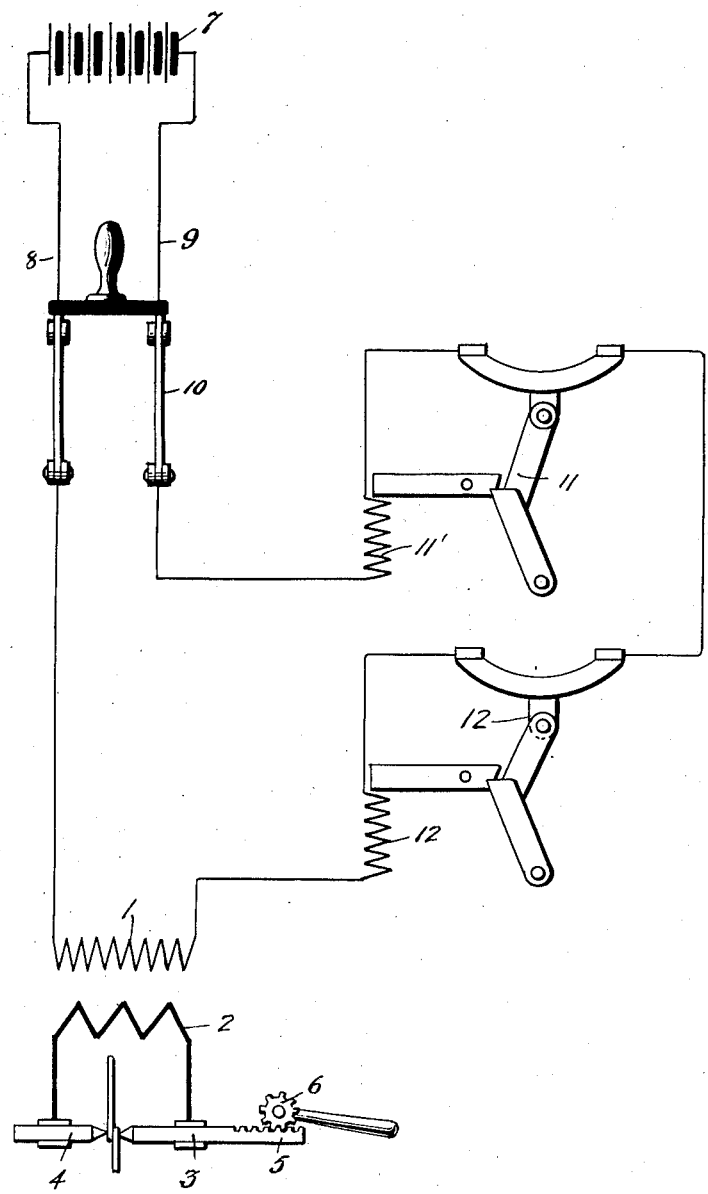

UNITED STATES PATENT OFFICE.

JOHN ALLEN HEANY, OF WASHINGTON, DISTRICT OF COLUMBIA.

ELECTRIC WELDING SYSTEM.

1,061,377.  Specification of Letters Patent.  Patented May 13, 1913.

Application filed October 7, 1912. Serial No. 724,314.

*To all whom it may concern:*

Be it known that I, JOHN ALLEN HEANY, a citizen of the United States, residing at Washington, District of Columbia, have invented certain new and useful Improvements in Electric Welding Systems; and I do hereby declare the following to be a full, clear, and exact description of the invention, such as will enable others skilled in the art to which it appertains to make and use the same.

The present invention relates to electric welding and more particularly to so-called spot welding, and has for its object to provide a simple and efficient form of apparatus adapted to be operated by direct current.

Attempts have heretofore been made to employ direct current to operate electric welding machinery, but without success owing to the fact that the heat required to develop welding temperature between the metal parts to be joined requires a current of relatively low voltage and of very high amperage, two conditions which are practically impossible of realization by the employment of direct currents in connection with the apparatus heretofore employed. It has therefore been customary to employ alternating currents which are passed through the primary of a transformer, having a large number of turns, which induces in the secondary of the transformer consisting of very few turns of a conductor of large size, currents of large volume and small voltage, the terminals of the secondary being connected to the welding electrodes by short heavy conductors. Inasmuch as the application of a direct current immediately to the welding electrodes is commercially impracticable, for the reasons before given, and because of the fact that there are many times and circumstances where alternating current is not available for use in welding apparatus owing to the fact that direct current only is obtainable, it has been found necessary to forego the recognized advantages of electric welding entirely. By means of the present invention, however, it is possible to utilize direct current from a storage battery, generator, or any other suitable and sufficient source to operate spot welding machines which require currents intermittently applied for very brief intervals of time. In order to render the direct current available for the purpose aforesaid, it is proposed to connect the source of direct current with the primary of an ordinary spot welding transformer and interpose in the circuit to said primary means for closing the circuit for a very brief interval of time and then when the current has built up to its maximum to suddenly interrupt the said circuit, thereby developing a heavy kick current in the secondary of the transformer which serves to induce between the parts of the work to be welded heat sufficient to effect the welding operation, the induced current being directed to the work and the necessary pressure applied thereto by the usual form of welding electrodes.

A simple form of apparatus for effecting the desired result is illustrated in the accompanying drawing, in which—1 indicates the primary of a welding transformer consisting of many turns of relatively fine wire, and 2 indicates the secondary of the transformer which, as usual, comprises a very few turns of heavy conductor the terminals of which are directly connected with the welding electrodes 3 and 4, the former of which is movable toward and from the latter by any appropriate operating means, such for example as the rack 5 and pinion 6, as indicated. The pieces of work to be welded together are placed between the electrodes in overlapped relation, in the usual manner, and the movable electrode brought into contact with the work so that the latter is held between the electrodes with sufficient pressure to insure an intimate and effective spot weld when the current is applied.

7 indicates a source of direct current typified by a secondary battery, although it is to be understood that any other appropriate source of direct current may be applied when available. Leads 8 and 9 conduct the current from the source 7 through the primary 1 of the welding transformer and a suitable switch or cut-out 10 is provided for permanently breaking the connection when the apparatus is not in use. Obviously, if the direct current were permitted to pass uninterruptedly through the circuit of the primary 1, no practical effect would be produced thereby, for the reason that no current would be induced in the secondary 2. However, a secondary current will be induced in the winding 2 of the transformer whenever the circuit from the direct source to the primary 1 is either made or broken. Upon making the circuit, a relatively feeble induced current is produced in the secondary, while when the circuit is broken after the current has reached its maximum, a relatively heavy current of brief duration is induced in the secondary. This latter current is according to the present invention rendered available for effecting spot welding between pieces of metal held between the electrodes 3 and 4. It is desirable, of course, to economize in the current employed, and therefore means are provided for closing the current between the direct current source and the primary of the transformer for a time sufficient only to effect the individual welds. To this end, it is proposed to place in the circuit of the primary 1 means, preferably under the control of the operator, to first establish or make the circuit and, when the current has attained its maximum, to suddenly break the circuit. This alternate making and breaking of the circuit may be effected by any appropriate switching mechanism, the operation of which may be effected or controlled by the operator, and a simple and highly efficient type of such apparatus is illustrated in the form of two overload switches 11 and 12, each of which, associated with its trip magnet 11' and 12' respectively, is in series, in one of the circuit leads, such as 9. The switch magnets 11' and 12' are so proportioned as to trip the respective switches when the full current from the direct current source 7 passes. Under normal conditions, therefore, at least one of the switches 11 and 12 would be open whenever the main switch 10 is closed.

To operate the system and apparatus as described, the work is placed between the electrodes and the movable electrode adjusted to proper contact to one side of the work by the operating connections 5 and 6, whereupon the operator grasps the handle of the particular switch 11 or 12 which is open, and closes the switch. A direct current circuit is then established from the source 7 through both of the switches in series and through the primary 1 of the transformer and back to the said source. After a very brief interval of time, the current flowing through the circuit between the source 7 and the primary 1 reaches its maximum or attains sufficient strength to cause the kick-off magnet of the overload switch, which is not held by the hand of the operative, to release the switch and break the circuit which, as indicated, induces a current of heavy amperage in the secondary 2 of the transformer, which induced current though of brief duration is sufficient in volume to effect a spot weld between the pieces of work. Obviously, if the weld is not completed by a single application of the induced current, it is only necessary that the operator shift his hand from the first overload switch, to the second and close the latter, holding said latter switch until the other switch is tripped by the building up of the current, when a second heavy induced current is developed in the secondary 2. After a spot weld has been perfected, the work is advanced to another point of welding and the operation is repeated.

In the practical operation of the apparatus, one of the switches 11 and 12 is normally closed, while the other is open. As soon as the workman closes the open switch, the direct current flowing in the mains quickly rises to a volume sufficient to operate the trip magnet of the closed switch and open the latter, so that the direct current is applied for a very brief period for each operation. In fact, the trip magnets 11' and 12' may be so constructed and adjusted as to effect the opening of the closed switch nearly simultaneously with the closing of the open switch by the operator, in which event, it will not be necessary for the operator to retain his hold upon the handle of the switch for any longer period than that necessary to effect the closing. Of course, it is possible to employ a single overload switch instead of two, inasmuch as the single switch would be thrown open by its magnet about as soon as the operator released his grip on the handle of the switch, but the provision of two overload magnets prevents waste of current due to carelessness or inattention of the operator who might hold a single switch closed longer than necessary.

The overload switches may be of any preferred form, and preferably will be provided with auxiliary carbon contacts to prevent the deleterious effects of arcing at the switch points at the time of the break.

What I claim is:—

1. An electric welding system comprising a direct current supply, a welding transformer, circuit connections between the primary of said transformer and said supply, and auto-manual means for breaking the circuit to said primary and thereby inducing a momentary welding current in the secondary.

2. An electric welding system comprising a direct current supply, a welding transformer, circuit connections between the primary of said transformer and said supply, and two auto-manual switches for alternately and successively breaking the circuit to the primary.

3. An electric welding system comprising a direct current supply, a welding transformer, circuit connections between the primary of said transformer and said supply, and two automatic overload switches in series in the primary circuit.

4. An electric welding apparatus for direct current comprising a transformer, and means in the circuit of the primary of said transformer under control of the operator for first making and then breaking said circuit at desired intervals.

In testimony whereof I affix my signature, in presence of two witnesses.

JOHN ALLEN HEANY.

Witnesses:
FRED. B. McLAREN,
CHAS. J. O'NEILL.